April 8, 1952 P. C. KLINE ET AL 2,592,432
CORRUGATION DRILLING TOOL
Filed Aug. 25, 1949
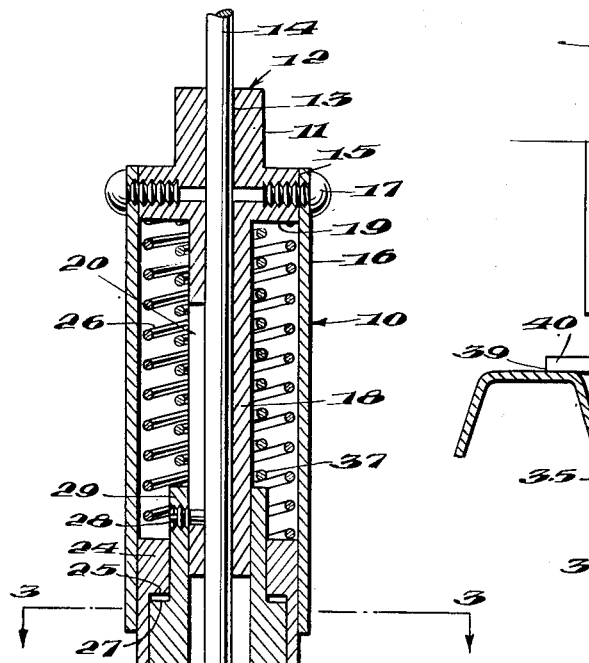
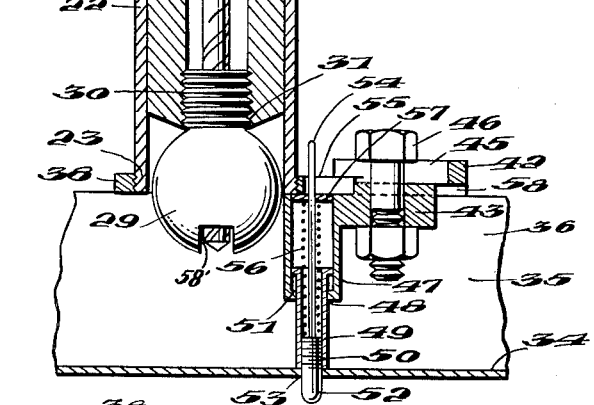
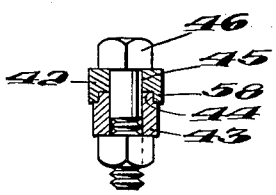
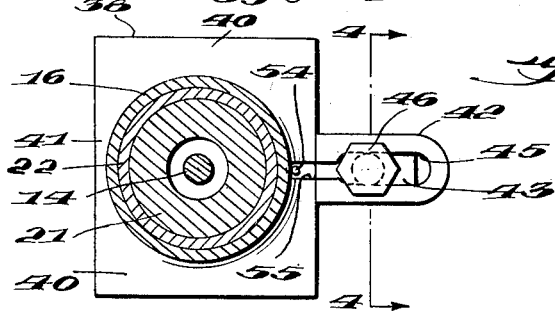
INVENTORS
PAUL C. KLINE,
HARRY P. CROOK,
BY ALBERT T. VAN CUTSEM,
ATTORNEY Patented Apr. 8, 1952

2,592,432

UNITED STATES PATENT OFFICE 2,592,432

CORRUGATION DRILLING TOOL

Paul C. Kline, Harry P. Crook, and Albert T. Van Cutsem, Baltimore, Md., assignors to The Glenn L. Martin Company, Middle River, Md., a corporation of Maryland Application August 25, 1949, Serial No. 112,258

3 Claims. (Cl. 77—55)

1

Our invention relates to a drill guide and more particularly a tool for centering a drill in the valley of a corrugation in corrugated sheet stock including an automatic drill hole spacer.

In the forming of structural members incorporating corrugated sheets for reinforcing and other purposes, it is customary practice to secure the parts together by riveting longitudinally of the corrugations. To form a proper rivet joint therein requires that the holes for the rivets be centered in the corrugation valleys of such material and also be drilled normal to the plane of the sheet. It is obvious that if such holes are not centered within the valley of each corrugation but are allowed to become formed in one of the radius areas adjacent thereto, a misalignment of the rivet placed therein is very apt to occur which will be turn result in the undesirable stressing of the parts with possible warpage of an outer sheet material. It is highly desirable that such riveting be evenly and uniformly spaced in order to avoid unequal distribution of the load carried by the rivets. Unevenly spaced rivets also present an unsightly appearance and have a tendency to pucker the material of a sheet so uniformly held thereby. The usual practice is to provide a special drill template, a spray template, or layout each series of drill holes by hand, all of which are costly practices.

The present invention provides a lightweight attachment for use with a drill press or a portable power drill in which a drill positioner is telescopingly carried at right angles to an axially movable aligning plate and is forwardly extendible relative to the drill with a drill bore spaced between wall engaging areas adapted for engagement for engagement with the sides of a corrugation valley of a corrugated sheet to center the drill and hold it perpendicularly aligned relative to the plane of the sheet including a hole spacer having a retractable pin adapted for centering within an adjacent previously drilled hole.

It is among the objects of our invention to provide a means for centering a drill in the valley of a corrugated sheet irrespective of the slope angle of the corrugation formed therein.

A further object is to provide a drill attachment capable of holding said drill normal to the plane of the corrugation during a drilling operation.

A still further object is to provide a combined drill guide and hole locator attachment to a portable drill which includes an adjustable and retractable drill hole spacing point adapted for insertion in a previously drilled hole.

Another object is to provide a drill guide capable of automatically centering a drill between sloped or curved corrugation walls at longitudinally spaced points along a corrugation as the drill is positioned for drilling a hole in the valley between said walls.

2

Other objects of this invention will become apparent from the following description when taken in conjunction with the accompanying drawing in which the like numbers refer to like parts in different views.

In the drawing:

Figure 1 is a vertical cross-sectional view of our corrugation drilling tool seated on a corrugation with the spacer positioned in a prior drilled hole.

Figure 2 is a front elevational view of the balled drill locator centered between the corrugation side walls with the drill extended.

Figure 3 is a top plan view of the tool taken on line 3—3 of Figure 1.

Figure 4 is a detailed sectional view taken on line 4—4 of Figure 3.

Referring in detail to the drawing, the corrugation drilling tool 10 of this invention is illustrated in Figure 1 as being adapted for operation in connection with a conventional electric drill motor, drill press or other drilling machine having a fixed housing or adaptor (not shown) capable of fixedly receiving the stub end 11 of the cylindrical drill guide member 12 provided with a centered drill bore 13 formed to receive a drill extension 14 rotatively inserted therethrough. Below end 11 of the guide 12 is formed with an outstanding shoulder portion of increased cross-section that provides a mount area 15 for a covering or enclosing sleeve 16 positioned as a downwardly extending skirt within which the positioning sleeves are telescoped under spring resistance as hereinafter described. The sleeve 16 is secured to the mount area 15 of the guide 12 by screws 17 or like securing means. The guide 12 is immediately reduced in cross-section below the mount area 15 to form a tube 18 extending downwardly from an annular abutment 19 placed normal to the guide bore 13. Spaced from the bottom of tube 18 and formed in the side thereof is a longitudinally extending closed-ended slot 20 which serves as an axial movement limiting means as hereinafter explained.

Telescopingly mounted over each other and over the end of tube 18 are a pair of cooperative positioning sleeves which we will refer to as an inner sleeve 21 and an intermediate sleeve 22. The intermediate sleeve 22 is exteriorly dimensioned for a slide fit relative to the inside surface of the covering sleeve 16 for inserted mounting therein with the one or lower end 23 exposed. The upper or inserted end 24 of sleeve 22 is formed with an interiorly extending apertured end wall 25. Positioned within the enclosing sleeve 16 with ends bearing respectively against the annular abutment 19 placed normal to the guide bore 13 and the inserted end 24 of the intermediate sleeve 22 is a suitable compression spring 26 for urging the intermediate sleeve into an extended position relative to the enclosing sleeve.

The inner sleeve 21 is formed with two outside diameters slightly less respectively than the inside diameter of the apertured end wall 25 and the exposed end 23 of the intermediate sleeve. The difference in outside diameters of said inner sleeve 21 form an annular shoulder 27 adapted to abut against said end wall 25 of the intermediate sleeve 22 to limit the amount of telescopic movement possible between sleeves 21 and 22. Inner sleeve 21 is normally positioned fully retracted within the intermediate sleeve 22 as shown in Figure 1.

The inner sleeve 21 is also formed with a bore slightly larger than the outside diameter of the tube 18 to provide for movement of the tube thereinto. Said telescopic movement is limited by a limiting screw 28 carried by the inner sleeve 21, spaced from its upper end end 29 in a recessed position relative to the surface of the sleeve with the end of the screw arranged to protrude into slot 20 formed in the side wall of tube 18 so as to strike against the closed ends of said slot to limit said movement of the tube within the inner sleeve.

Encircling tube 18 is a coiled inner spring 37 placed under compression with its opposite ends respectively bearing against abutment 19 of guide 12 and the upper end 29 of the inner sleeve 21 so as to urge said sleeve into as extended a position as permitted by slot 20 of tube 18.

Carried by the inner sleeve 21 for up and down movement therewith is a spherical drill centering member, or ball-like drill locator 29. Mounting means for the locator 29 is provided by a neck, or extension 30 formed at the top of the ball and provided with a left-handed thread adapted for threaded engagement with the cooperatively threaded end 31 of sleeve 21.

Locator 29 is provided with a centered bore 32 to allow drill 14 to project therethrough to drill a hole 33 centered in the valley area 34 formed adjacent the bottom of walls 35 of a corrugated sheet 36 (see Figure 2). Locator 29 is also formed with a transversely extending cutaway area 58' proportioned to allow for ready removal of any drill chips or cuttings carried upwardly by the drill. As shown in Figure 1, the cutaway area 58' forms a slot generally rectangular in cross-section, the width of which is substantially equal to the diameter of the drill bore. The spherical form and dimensions of the locator 29 are adapted to fit all conventional shapes and sizes of corrugations so as to automatically center a drill 14 of suitable size in the valley area 34 without any special technique of operation being exercised by the operator. The urge of inner spring 37 is adapted to hold the ball-like locator 29 in close engagement with the corrugation walls 35 during the drilling operation. The locator being readily unscrewed out of the threaded end 31 of the inner sleeve 21 allows for substitution of as many different sized locators as found necessary for all conventional corrugation drilling.

Placed normal to the drill bore 13 and threadedly secured to the lower end 23 of the intermediate sleeve 22 is a flat aligning plate 38 adapted for positioning across the crests 39 of a corrugated sheet 36 so as to span the valley 34 of the corrugation to be drilled. Plate 38 is dimensioned to provide side areas 40 of sufficient length to span across any conventionally spaced corrugation which assures that the drill 14 will be automatically positioned 90° normal to the plane of the sheet to which another member is to be attached. In this manner, any tendency of the drill to misalign relative to the plane of the sheet is avoided. The plate 38 is generally rectangular and is of sufficient rigidity to properly support the tool and acts as a bridge relative to the corrugation crests 39. The front area 41 of plate 38 is limited in depth so as to reduce the work area required for the tool allowing it to be worked relatively close to an end wall or other obstruction as may be encountered on a conventional riveting work piece.

Extending radially of the drill bore 13 is a spacer arm 42 formed with an undercut adjusting slot 45 as part of or as an extension of plate 38 so as to carry and radially position the retractable hole spacing unit hereinafter described for variable spacing relative to the drill 14. The hole spacing unit is comprised of a bracket 43 formed with a tongued top surface 44 (see Figure 4) and is adapted for cooperative engagement in the undercut portion 58 of the adjusting slot 45 formed in the underside of arm 42 to provide for precise slidable adjustment therewith on loosening of the bolt and nut assemblage 46 used as a securing means. Formed in one end of the bracket 43 is a straight walled cup 47 having an aperture 48 formed in the bottom thereof. Within the cup 47 is mounted a sleeve 49 adapted for slidable movement within the cup with its lower end 50 protruding through said aperture 48. The top of sleeve 49 is formed with an outwardly extending angular flange dimensioned to slide within the cup and abut against the bottom wall 51 of said cup. Carried by the sleeve 49 at the bottom end 50 thereof is a spacing pin 52 formed with a round nose or end dimensioned for precise centered insertion in a drilled hole 53 previously formed in the valley area 34 of the corrugated sheet 36. The pin 52 is also provided with a centered indicator rod 54 that extends upwardly through the cup 47 to protrude through the rod slot 55 formed in plate 38 so as to provide a visible means of indicating the position of the pin in its extended or retracted status. The sleeve 47 is urged into extended position by a suitably dimensioned compression spring 56 placed around the indicator rod 54 with one end placed against a washer 57 positioned at the top of the cup 47 under plate 38 with the other end of spring 56 being placed adjacent pin 52.

The function of our tool is to precisely center and hold a drill to a 90° angle in the valley of a corrugation irrespective of the angle of the side walls 35 of such corrugated material or whether or not the corrugation varies in depth, with the hole to be drilled uniformly spaced from a previously drilled hole 53 arranged as a locating or starting hole into which the pin 52 is inserted.

Although we have found that the provision of a grooved adjusting slot 45 adds greatly to the speed of manipulation in attaining different spacings of the pin 52 relative to the bore 13, it is to be understood that this feature can be eliminated without departing from the scope and spirit of the invention.

The operation of our corrugation drilling tool is as follows:

The tool 10 is mounted in a suitable drilling machine (not shown) with the stub end 11 of the drill guide 12 secured against rotation in an extension or adaptor carried by the drilling machine. Drill extension 14 is engaged for rotation by the chuck of said machine with its drilling end positioned within the ball-like locator 29 formed with a bore 32 of suitable size for passage of the drill.

A master or starting hole 53 is center drilled at a predetermined distance from the edge of the corrugated sheet 36 by positioning the aligning plate 38 across crests 39 and exerting downward pressure on the tool 10.

Pressure of sufficient force to overcome the urge of compression spring 26 is exerted axially of the tool 10 which forces the locator 29 downwardly out of the intermediate sleeve 22 held in plate 38 stopped against further movement by crests 39. The contour of the locator 29 is such as to engage walls 35 of corrugation at opposed points and center its bore 32 relative to the valley area 34. Continued downward pressure applied axially of the tool 10 telescopes the tool guide tube 18 within the inner sleeve 21 allowing for the axial extension of the drill 14, which is simultaneously rotated, into centered drilling engagement with the corrugation valley 34. Upon completion of the drilling of hole 53, pressure on the tool is released allowing sleeves 21 and 22 to assume their original positions under urge of springs 26 and 37 with screw 28 abutting against the bottom of slot 20 formed in tube 18.

The next step where a series of spaced holes are to be drilled in valley 34 is to loosen the bolt and nut assemblage 46 which allows the spacer bracket 43 to be adjusted to attain the desired rivet hole spacing. The bracket 43 is slid along groove 58 to the desired point and then firmly gripped in place on tightening of the nut on bolt 46.

Subsequent holes can then be quickly drilled on successive insertion of pin 52 in the previously drilled hole 53, as shown in Figure 1, and downward movement of the tool 10 as previously described. Each hole as drilled becomes the master for a succeeding hole to be drilled which assures that all holes in the work piece will be uniformly spaced along the relative valley 34 to each other.

While we have shown and described in detail the preferred embodiment of our invention, it will be appreciated that certain changes, alterations, modifications, and substitutions can be made without departing from the spirit and scope of the claims.

We claim as our invention:

1. A tool for use with a drilling machine having a drill rotated by a chuck within a fixed housing comprising a bored drill guide adapted for attachment to the machine housing with the other end free and formed for protruded positioning of the drill, a sleeve member telescopically carried by the free end of said guide with stop means between the sleeve and guide limiting the telescopic movement therebetween with spring means urging the sleeve into an etxended position, a drill hole locator carried by the sleeve and provided with a centered aperture aligned with the drill bore, a transverse slot formed in said locator intersecting said bore and having opposed walls lying closely adjacent the path of said drill, said locator being provided with spherical engaging surfaces for engagement with the workpiece to be drilled, a second sleeve slidably fitted on the first-mentioned sleeve having a lower end retractable relative to the locator with cooperative spring and stop means associated with the second sleeve to normally position said lower end adjacent the locator, and a positioning member carried by the second sleeve having a planar surface radially extended to the side of and at right angles to the drill bore for engagement with the work piece to be drilled.

2. A guide for use with drilling tools of the type employing a rotatable drill, said guide being adapted to position said drill in the valley portions of corrugated material for drilling holes accurately spaced from one another and from the walls of said corrugations, said guide comprising a supporting member adapted for axial movement with said drill, an aligning member carried by said supporting member adapted to seat on crests of said corrugations adjacent said valley portions whereby the axis of said drill is angularly aligned, said aligning member being allowed limited movement in the direction of said drill axis from a normally extended position for allowing contact between said drill and material, said aligning member including a pilot pin radially disposed from the axis of said drill for engaging an adjacent hole in said valley and controlling the spacing between said holes, and a locating member including a locator carried by said supporting member adapted for limited movement in the direction of said drill axis from a normally extended position for allowing contact between said drill and material, said locator having a pair of generally spherical surfaces for engaging the walls of said corrugations on either side of said drill, the length of said drill being such that contact with said material is made subsequent to seating of said aligning and locating members.

3. A guide for use with drilling tools of the type employing a rotatable drill, said guide being adapted to position said drill in the valley portions of corrugated material for drilling holes accurately spaced from one another and from the walls of said corrugations, said guide comprising a supporting member adapted for axial movement with said drill, aligning and locating members carried by said supporting member in such a manner as to allow for independent limited movement in the direction of said drill axis from normally extended positions, said aligning member being adapted to seat on crests of said corrugations whereby said drill is angularly aligned, said aligning member including a pilot pin radially disposed from the axis of said drill for engaging an adjacent hole in said valley and controlling the spacing between said holes, said locating member including a locator carried at one end thereof for contacting the walls of said corrugations on either side of said drill, said locator having generally spherical contacting surfaces adapted to position said drill with respect to said corrugation walls, the length of said drill being such that contact with said material is made subsequent to seating of said aligning and locating members.

PAUL C. KLINE.
HARRY P. CROOK.
ALBERT T. VAN CUTSEM.

REFERENCES CITED

The following references are of record in the file of this patent:

UNITED STATES PATENTS

| Number | Name | Date |
|---|---|---|
| 447,014 | Pryibil | Feb. 24, 1891 |
| 2,335,614 | Spievak | Nov. 30, 1943 |
| 2,338,765 | Hartman | Jan. 11, 1944 |
| 2,401,490 | Little | June 4, 1946 |
| 2,409,377 | Miller | Oct. 15, 1946 |

FOREIGN PATENTS

| Number | Country | Date |
|---|---|---|
| 356,942 | England | Sept. 17, 1931 |